United States Patent [19]

Gammon et al.

[11] Patent Number: 4,662,078
[45] Date of Patent: May 5, 1987

[54] CONSTRUCTION STRING REEL

[75] Inventors: Norman P. Gammon; Phillip R. Gammon, both of San Francisco, Calif.

[73] Assignee: Gammon Reel, Inc., San Francisco, Calif.

[21] Appl. No.: 869,420

[22] Filed: Jun. 2, 1986

[51] Int. Cl.⁴ .............................................. B43L 7/00
[52] U.S. Cl. ........................................ 33/413; 33/138
[58] Field of Search ......................... 33/413, 138, 414; 242/107.3, 107.5, 107.6

[56] References Cited

U.S. PATENT DOCUMENTS

| 4,142,693 | 3/1979 | Czerwinski | 33/138 |
| 4,487,379 | 12/1984 | Drechsler et al. | 33/138 |
| 4,555,854 | 12/1985 | Kuntze | 33/138 |
| 4,592,148 | 6/1986 | Longenette | 33/414 |

FOREIGN PATENT DOCUMENTS 18898 of 1893 United Kingdom ................. 33/414

Primary Examiner—Willis Little
Attorney, Agent, or Firm—Phillips, Moore, Lempio & Finley

[57] ABSTRACT

Disclosed herewith is an improved reel assembly for surveyors and other construction trades wherein the resilient member that retrieves the plumb line or string is entirely enclosed in the spool assembly that is contained within the housing of the reel assembly. The spool assembly is formed so that it is difficult to obtain access to the resilient member thereby precluding inadvertent release of the spring assembly.

14 Claims, 10 Drawing Figures

CONSTRUCTION STRING REEL

BACKGROUND OF THE INVENTION

This invention relates to an enclosed spring loaded target reel assembly for use principally with a plumb bob. It relates in particular to the structure and location of the resilient member which serves to retrieve the string. The invention is also useful for any construction project in which a straight line is required.

For years, surveyors have utilized a spring loaded target reel assembly substantially as described in U.S. Pat. No. 3,172,205. While this reel has served admirably in the surveying trade, it suffered in that the rather small overall size of the reel precluded its use in related industries such as carpentry, plumbing and the other related construction trades. Simply stated, the surveyor's reel as described in the aforesaid patent was unable to receive more than about 8 feet (2½ meters) of usable string. Attempts to place more string on the reel required either a heavier spring or more reel space or both.

While additional reel space could have been provided by increasing the outer diameter of the reel, the addition of a longer spring posed a very real problem. The structure of the target reel in the prior art included an open inner reel with an exposed leaf spring. With the addition of the length to the leaf spring, relieving the tension on the spring during disassembly of the reel to replace the string became a rather worrisome problem. Specifically, the possibility of inadvertent removal of the lengthened spring from the open reel of the present device was felt to be unacceptable.

Accordingly, a closed reel was considered more appropriate. Further, it was felt appropriate to design the reel so that, while it was relatively easily removed from the case, it was difficult to disassemble to avoid unexpected relief of the tensioning member.

With the increased size of the reel to accept additional string and to accept the lengthened resilient member, the friction between the reel member and the case was increased to a point where rotation of the reel became somewhat difficult.

While the reel of the prior art is relatively easy to assemble, a closed reel presented a very real problem when the spring, of necessity, had to be mated with the housing so that tension could be applied to the reel while the string was being unwound from the housing.

It is a primary objective of this invention to provide a spring loaded reel for use with a plumb bob or for any other line requirement that will accept a suitable amount of string and which has an enclosed spring.

It is also an object of this invention to reduce the friction between the reel and the housing.

It is further object to provide a positive lock between the reel and the spring.

With these problems in mind, the present invention provides a reel for receiving string which comprises a case assembly, and a spool assembly. The spool assembly has a cover member and a spring member and a resilient member. The spring member is lockingly fixable within the cover member. The resilient member is substantially contained within the spring member and fixed at its first end to the case assembly and at its second end to the spring member so that rotation of the spool assembly in the case assembly will tension the resilient member.

BRIEF DESCRIPTION OF THE DRAWINGS

Other objects and advantages of this invention will become apparent from the following description and accompanying drawing wherein.

DETAILED DESCRIPTION OF THE EMBODIMENT

Figure 1:
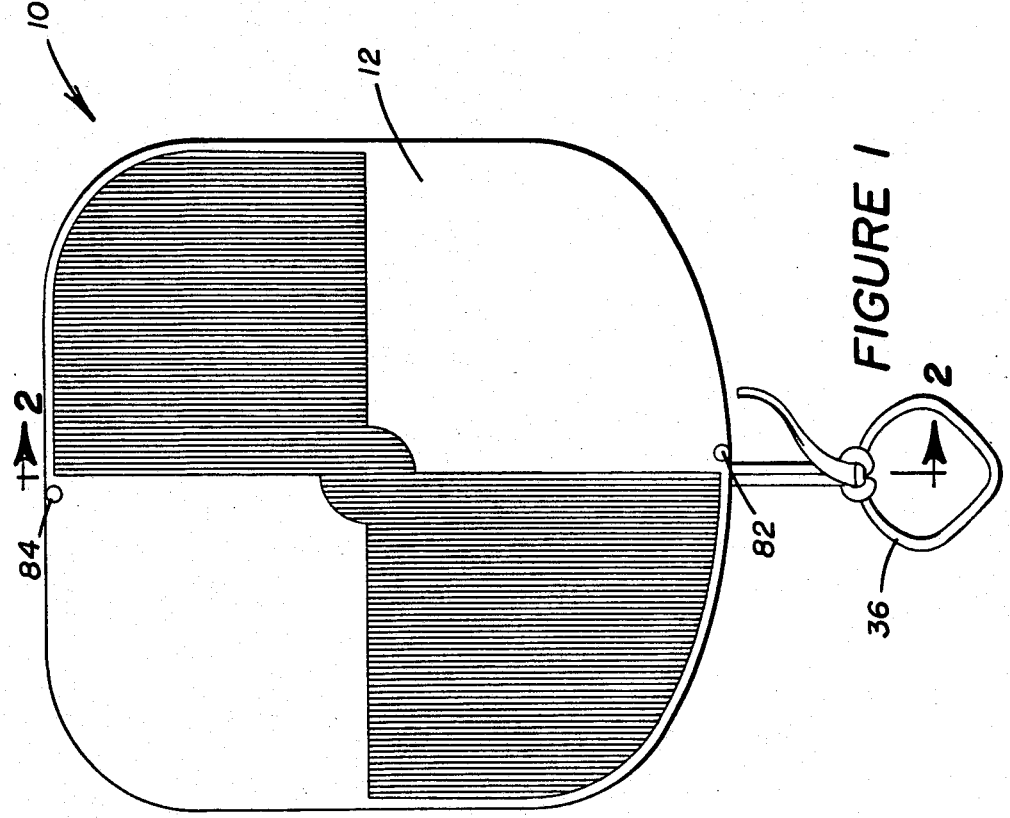
FIG. 1 is a front elevation of the preferred embodiment of the reel described herein.

Referring to FIG. 1, a reel assembly 10 is shown in elevation. Reel assembly 10 preferably has affixed to the front surface thereof a target device 12 to facilitate viewing the reel from a distance. This target 12 may be formed of two contrasting colors as shown in FIG. 1, preferably red and white.

Figure 2:
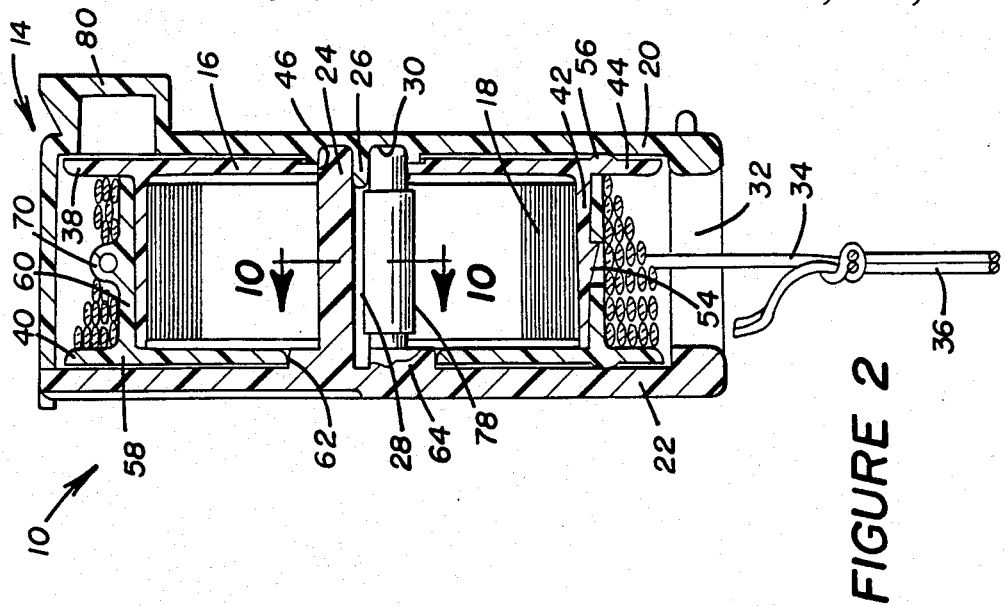
FIG. 2 is a sectional drawing of the reel shown in FIG. 1 taken at section line 2—2.

The reel assembly 10 is shown in FIG. 2 in section. It can be seen that the reel assembly comprises a case 14, a spool assembly 16 and a resilient member 18. Resilient member 18 is preferably a flat leaf spring that is tensioned by rotation of spool assembly 16 relative to case 14. More will be said regarding this in the ensuing description.

Case assembly 10 consists of a housing 20 and a cover 22. Cover 22 has integrally formed therewith an axle 24 which is adapted to mate with housing 20 by means of a lug 26 formed with housing 20 and that intersects with a slot 28 formed diametrically in axle 24. It can be seen from FIG. 2 that axle 24 further mates with a cavity 30 formed in one side of housing 20. The purpose of this mating is to prevent movement of axle 24 relative to housing 20.

Cover 22 is fitted to housing 20 by any appropriate means known in the art. In this particular instance molded lugs (not shown) are formed on cover 22 which fit in mating sockets (not shown) in housing 20. Housing 20 has formed on one side thereof an opening 32 so that string 34 may pass into the housing and onto spool assembly 16. In FIGS. 1 and 2, a ring 36 is shown on string 34. This ring 36 would normally be replaced with a plumb bob (not shown) when this reel is used in the construction trades.

Spool assembly 16 consists of a spring member 38 and a cover member 40. As can be seen in FIG. 2, spring member 38 is received into the cavity formed in cover member 40.

Figure 3:
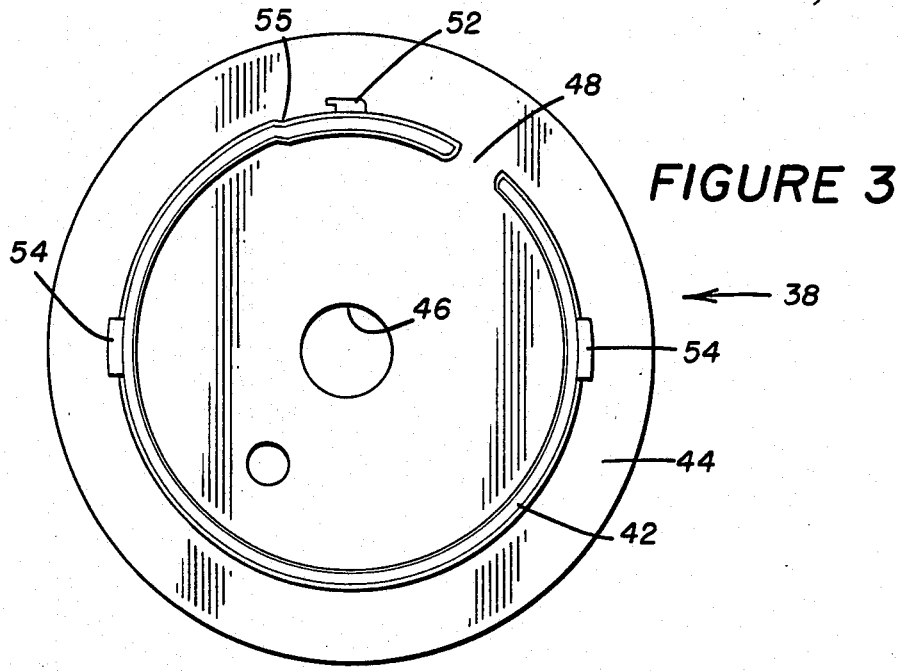
FIG. 3 is a plan view of the spring member of the spool assembly.
Figure 4:
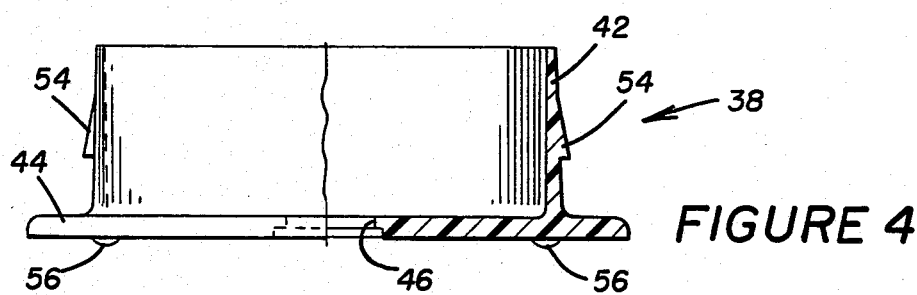
FIG. 4 is an elevation view partly in section of the spring member shown in FIG. 3.

Referring now to FIGS. 3 and 4 for a better understanding of spring member 38, it can be seen that spring member 38 consists of an upstanding cylinder hereinafter referred to as spring cylinder 42 and a flange 44.

Figure 5:
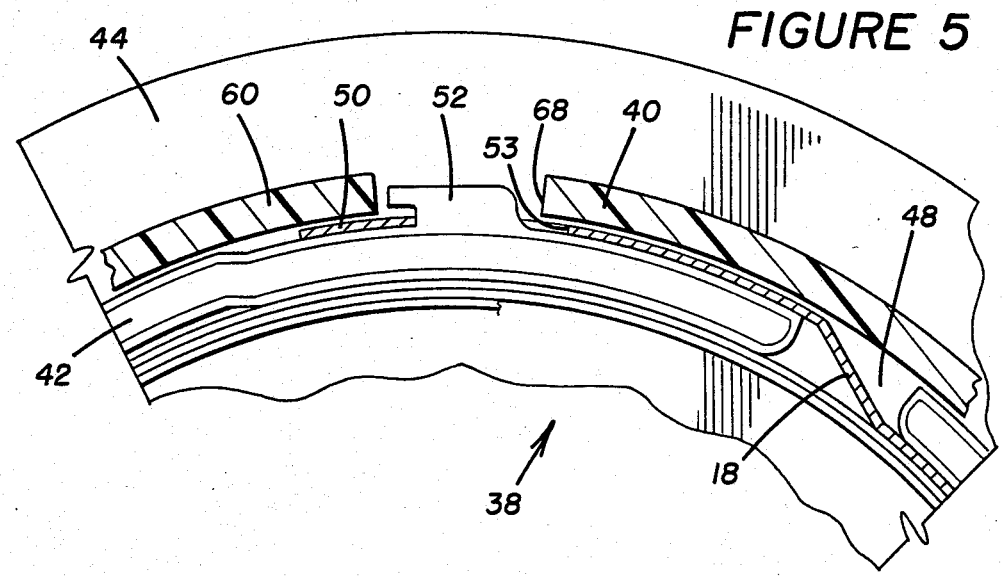
FIG. 5 is a detailed view of the spring member shown in FIG. 3 showing the retaining lug and the resilient member in relation to the cover member.

Flange 44, which serves as a side of spool assembly 16, has formed in the center thereof an axial hole 46 of sufficient diameter to receive axle 24 as shown in FIG. 2. Spring cylinder 42 defines an axial slot 48 through which one end 50 of resilient member 18 may pass. Formed adjacent to axial slot 48 is a retaining lug 52 on the outer periphery of spring cylinder 42. Retaining lug 52 may be formed as shown in FIG. 5 so that a slot 53 in the one end 50 of resilient member 18 may be slipped over the retaining lug 52 to retain the one end of the resilient member relative to spring cylinder 42. It should be further be noted that the outer radius of spring cylinder 42 is reduced from the axial slot 48 to a point 55 somewhat past the retaining lug 52. The reduced radius permits resilient member 18 to fit between spring cylinder 42 and cover member 40 as shown in FIG. 5. Preferably this reduced area encompasses less than 60° of the outer perimeter of spring cylinder 42. Further, the lug 52, preferably, is within 40° of axial slot 48.

Also formed on the outer periphery of spring cylinder 42 are at least two locking lugs 54 which, as will be seen, will be lockingly received in mating holes in cover member 40.

Also formed on spring member 38 are a plurality of small projections 56 (see FIG. 4) which serve to separate spring member 38 from housing 20 thereby reducing the frictional area thus facilitating rotation of the spring member in the housing.

Figure 7:
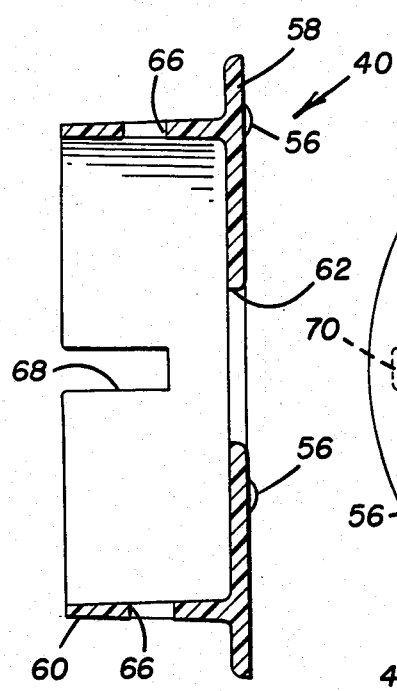
FIG. 7 is a sectional view of the cover member shown in FIG. 6 taken at line 7—7.
Figure 6:
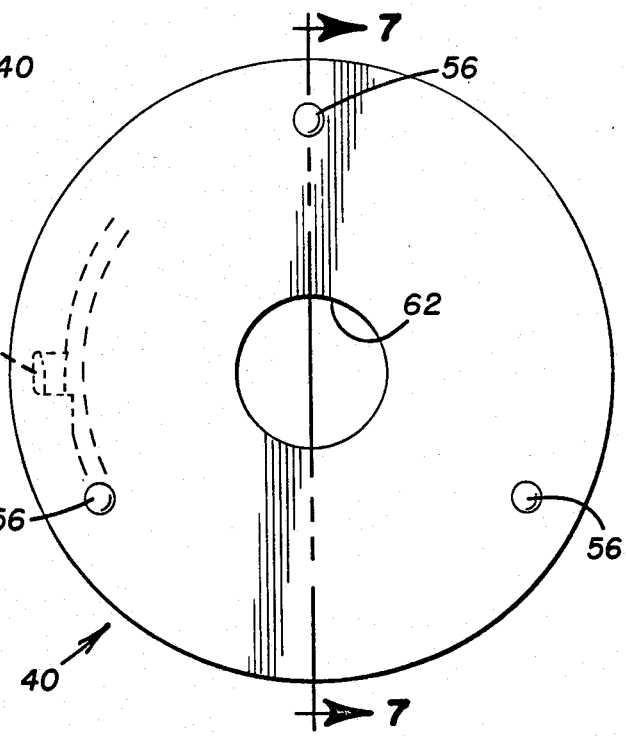
FIG. 6 is a plan view of the flange side of the cover member of the spool assembly.

Referring to FIG. 7, cover member 40 is shown in section. Cover member 40 consists of a flange 58, which forms the second side of spool assembly 16, and a string cylinder 60. Formed in flange 58 is an axial hole 62 that is adapted to rotate about an enlarged axial portion 64 of axle 24 and formed in cover 22. Hole 62 is purposely enlarged to a size greater than hole 46 located in flange 44 of the spring member so that assembly of the reel may be facilitated. The larger hole only permits assembly in one manner thus prevents damage to the Spring 18. As previously noted, there are a plurality of holes 66 formed in string cylinder 60 and spaced on that cylinder so that the locking lugs 54 on spring cylinder 42 may mate with the holes in string cylinder 60 thereby locking the two members together.

String cylinder 60 has, in the periphery thereof, an axial slot 68 which is formed to receive retaining lug 52 as shown in FIG. 5.

Figure 8:
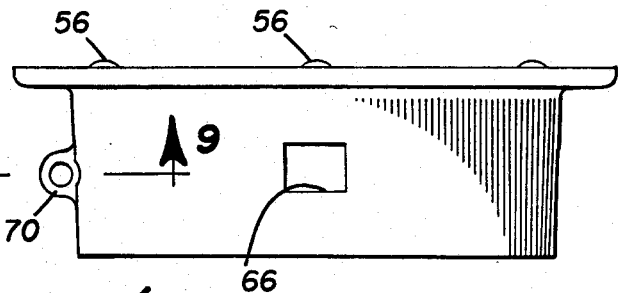
FIG. 8 is an elevation view of the cover member.
Figure 9:
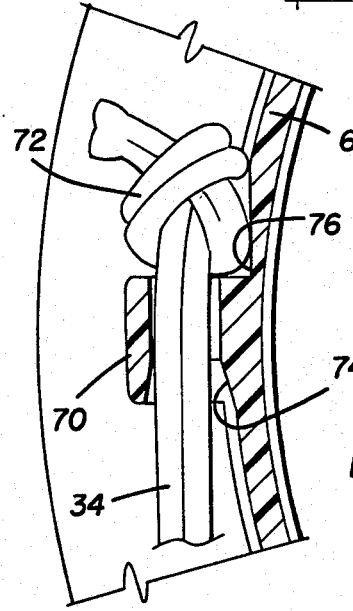
FIG. 9 is a detailed sectional view of the cover member shown at line 9—9 of FIG. 8.

Referring now to FIGS. 8 and 9, it can be seen that string cylinder 60 has an outstanding molded eye 70 that is used to lock string 34 to the string cylinder 60. This may be done with a conventional knot 72 or any other appropriate means. It has been found convenient to have a conical opening 74 in eye 70 so that string 34 may be more readily fed therethrough. Similarly, on the opposite side of eye 70 from conical opening 74 a depression 76 may be formed in string cylinder 60 so that the knot will lie closer to the surface of the cylinder.

As with spring member 38, cover member 40 is formed with a plurality of projections 56 to reduce surface contact between cover member 40 and cover 22.

Figure 10:
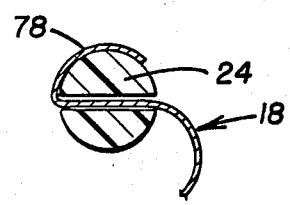
FIG. 10 is a sectional view of the axle taken at line 10—10 of FIG. 2.

Spring or resilient member 18 is in the form of a coil spring, and as can be seen in FIG. 2, is contained wholly within spring cylinder 42 except for the one end 50 which passes through slot 48 to locking lug 52. The opposite end 78 is passed through slot 28 in axle 24 as shown in FIGS. 2 and 10. This fixes resilient member 18 at one end to case 14 and at the other end to spool assembly 16 so that when spool assembly 16 is rotated within case 14, resilient member 18 will be "wound" or tensioned.

The features described herein facilitate assembly of the reel assembly and further make it difficult to disassemble the spool assembly so that inadvertent release of tension in resilient member 18 is precluded. These features also provide a positive lock between the reel and the housing.

As previously indicated, resilient member 18 is positioned within spring cylinder 38 by passing through axial slot 48 and being lockingly engaged with retaining lug 52. At this point cover member 40 is placed over spring member 38 in a manner shown in FIG. 2 so that the locking lugs 54 become engaged in the holes 66 of cover member 40. As shown in FIG. 5, string cylinder 60, when assembled with spring cylinder 42, serves to lock end 50 in locking lug 52. When assembled, spring member 38 and cover member 40 form a spool as shown in FIG. 2. While it is possible to disassemble the cover member from the spring member at this point, it requires a positive effort on the part the disassembler to disengage the locking lugs 54 from holes 66 in cover member 40.

With the assembled spool assembly 16, it is appropriate to add string 34 to the assembly. It is envisioned that the reel should be capable of holding approximately 15½ or 16 feet of string (4.5 meters). It can be seen at this point that flanges 44 and 58 with string cylinder 60 form a rather conventional spool. The string 34 is then wound upon the spool as formed so that the entire amount of string is contained thereon.

To continue assembly, the axle 24 of cover 22 is passed partially into hole 62 of cover member 40 so that the end 78 of resilient member 18 may be engaged with slot 28 of axle 24. It should be noted that the hole 62 is made larger so that axle 24 may be moved relative to the spool assembly 16 during assembly. Simultaneously, one can operate through the axial hole 46 of spring cylinder 42 to position resilient member 18 as necessary. It may be appropriate to use a jig (not shown) to hold the end 78 in position to engage the slot 28.

At this point, spool assembly 16, which has been mounted on axle 24 is given two or three turns to pretension the resilient member 18 relative to the cover 22. The cover 22, along with spool assembly 16, is then positioned in housing 20 with the axle 24 being positioned in cavity 30 and mating with lug 26. With ring 36 on string 34, the string is not drawn into the reel assembly. However, if string 34 is withdrawn from the reel assembly through slot 32 additional tension is placed on resilient member 18 so that when string 34 is released it will be retrieved into case 14 of the reel assembly 10.

While it should be apparent to those skilled in the art how the reel assembly is used, a few words are offered herewith to insure that operation is clearly understood.

With the reel assembled as shown in FIG. 2 and in accord with the directions set forth above, a string 34 is contained on spool assembly 16 with a pre-tension on resilient member 18. Ordinarily, some engineering device such as a plumb bob replaces ring 36 at the end of string 34. When one wishes to use a plumb bob and string 34 to obtain a true vertical or "plumb" line, the string may be withdrawn from the reel assembly 10 to the desired length. A lug 80 is formed on housing 20 in a manner well known in the art along with two small projections 82 and 84 on the target face of the reel assembly 10 so that the string may be locked relative to the housing by wrapping around lug 80 or used by passing it down between the two lugs 82 and 84. The target face 12 is also available for use with string 34 and a plumb bob (not shown).

The reel and string with a plumb bob, as noted, gives a true vertical which is particularly important, for example, when installing frames in a building, insuring that plumbing stacks are in fact vertical through the building or determining a location on a floor directly below a point on a ceiling. When the use of the line is completed, one merely has to retrieve it by relieving it from lug 80 and allowing the string 34 to be drawn back into the housing 20.

While this invention has been described in relation to a particular embodiment, it should be limited only by the appended claims.

We claim:

1. An encased reel for receiving string comprising:
   a case assembly;
   a spool assembly, said spool assembly rotatably mounted in said case assembly, the spool assembly having a cover member, a spring member and an elongated resilient member in said cover member, said spring member lockingly fixable in said cover member, said cover member having a string cylinder and a cover flange integrally formed with said string cylinder, said spring member having a spring flange and a spring cylinder, said spring flange integrally formed with said spring cylinder, the string cylinder defining an axial slot, and the spring cylinder defining an axial slot, the spring cylinder further including a resilient member retaining lug on the outer periphery thereof adjacent the spring cylinder axial slot, the spring cylinder having a reduced outer peripheral radius from the axial slot to beyond the retaining lug, said spring cylinder formed to substantially receive said elongated resilient member interior thereof with the first end of said resilient member affixed to said case assembly and the second end of said resilient member extending through the axial slot of the spring cylinder and affixed to the resilient member retaining lug.

2. The assembly of claim 1 wherein said cover member and said spring member each have means for reducing surface contact area between said case assembly and said spool assembly.

3. The encased reel of claim 1 wherein said spring cylinder is formed with locking means and adapted to be lockingly received within the string cylinder such that said cover flange and said spring flange will serve to retain string wound on the outer periphery of said string cylinder.

4. The reel assembly of claim 3 wherein said cover member and said spring member each have means for reducing surface contact area between said case assembly and said spool assembly.

5. The reel of claim 3 wherein the string cylinder defines at least two locking holes and further wherein the spring cylinder includes at least two locking lugs on the outer periphery thereof, said locking lugs positioned in the same relative position as said locking holes.

6. The reel assembly of claim 1 wherein said case assembly consists of a housing and a cover plate; said cover plate having formed therewith an axle, said axle formed to receive and retain said first end of said resilient member and further said axle formed to rotably receive said spool assembly.

7. The reel assembly of claim 6 wherein each of the cover member and the spring member define axial holes in the center of the respective flanges, the axial holes of sufficient size to receive the axle, the axial hole of the cover member being relatively larger than the axial hole of the spring member to facilitate fixing the resilient member to the axle.

8. The reel assembly of claim 1 wherein said cover member serves to lock the resilient member to the outer perimeter of the spring member.

9. The reel of claim 1 wherein the reduced radius is for a sector of less than 60°.

10. The reel of claim 9 wherein the retaining lug is located within 40° of the axial slot.

11. The reel of claim 1 wherein the retaining lug is adapted to fit in the axial slot of the string cylinder whereby the resilient member is locked to the spring cylinder.

12. In an encased reel for receiving string having a case assembly;
    an improved spool assembly having a cover member, a spring member and an elongated resilient member in said cover member, said spring member lockingly fixable in said cover member, said cover member having a string cylinder and a cover flange integrally formed with said string cylinder, said spring member having a spring flange and a spring cylinder, said spring flange integrally form with said spring cylinder, the string cylinder defining an axial slot, and the spring cylinder defining an axial slot, the spring cylinder further including a resilient member retaining lug on the outer periphery thereof adjacent to spring cylinder axial slot, the spring cylinder having a reduced outer peripheral radius from the axial slot to beyond the retaining lug; said spring cylinder formed to substantially receive said elongated resilient member interior thereof with the first end of said resilient member affixed to said case assembly and the second end of said resilient member extending through the axial slot of the spring cylinder and affixed to the resilient member retaining lug.

13. The improvement of claim 12 wherein said cover member and said spring member each have means for reducing surface contact area between said case assembly and said spool assembly.

14. The improvement of claim 13 wherein said case assembly consists of a housing and a cover plate; said cover plate having formed therewith an axle, said axle formed to receive and retain said resilient member and further said axle formed to rotatably receive said spool assembly.

* * * * *